United States Patent
Suchindran et al.

(10) Patent No.: US 12,141,797 B2
(45) Date of Patent: Nov. 12, 2024

(54) SYSTEM AND METHOD FOR DEVICE MANAGEMENT OF INFORMATION HANDLING SYSTEMS USING CRYPTOGRAPHIC BLOCKCHAIN TECHNOLOGY

(71) Applicant: Dell Products, L.P., Round Rock, TX (US)

(72) Inventors: Vaishnavi Suchindran, Bangalore (IN); Ravi Shekhar Singh, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 210 days.

(21) Appl. No.: 17/648,884

(22) Filed: Jan. 25, 2022

(65) Prior Publication Data
US 2023/0237473 A1 Jul. 27, 2023

(51) Int. Cl.
| | | |
|---|---|---|
| G06F 13/10 | (2006.01) | |
| G06F 13/42 | (2006.01) | |
| G06F 21/78 | (2013.01) | |
| G06Q 20/38 | (2012.01) | |
| H04L 9/00 | (2022.01) | |

(52) U.S. Cl.
CPC ..... *G06Q 20/3825* (2013.01); *G06F 13/4282* (2013.01); *G06F 21/78* (2013.01); *G06Q 20/3823* (2013.01); *G06Q 20/3827* (2013.01); *H04L 9/50* (2022.05)

(58) Field of Classification Search
CPC ......... G06F 13/4282; G06F 21/78; H04L 9/50
See application file for complete search history.

(56) References Cited

U.S. PATENT DOCUMENTS

| | | | |
|---|---|---|---|
| 10,630,537 B2 * | 4/2020 | Bar-Joshua | H04L 41/147 |
| 10,922,309 B2 * | 2/2021 | Roets | G06F 16/2379 |
| 11,042,804 B2 * | 6/2021 | Kikinis | H04L 63/0263 |
| 11,403,402 B2 * | 8/2022 | Kumar | G06F 16/1834 |
| 11,676,219 B2 * | 6/2023 | Cella | G06Q 30/0201 |
| | | | 705/38 |
| 11,790,317 B2 * | 10/2023 | Javaheri | G06Q 10/0838 |
| | | | 705/29 |
| 2017/0206532 A1 * | 7/2017 | Choi | G06Q 30/02 |
| 2018/0089436 A1 * | 3/2018 | Smith | H04L 9/3236 |
| 2020/0174463 A1 * | 6/2020 | Cella | G05B 23/0229 |
| 2020/0184739 A1 * | 6/2020 | Nathan | G06Q 10/20 |
| 2023/0128825 A1 * | 4/2023 | Meiyappan | H04W 74/008 |
| | | | 370/329 |
| 2023/0145936 A1 * | 5/2023 | Kim | H04L 9/3268 |
| | | | 713/156 |

\* cited by examiner

*Primary Examiner* — Cheng Yuan Tseng
(74) *Attorney, Agent, or Firm* — Fogarty LLP (57) ABSTRACT

According to one embodiment, a computing environment having multiple Information Handling Systems (IHSs), each having one or more field replaceable units (FRUs) and a ledger of a blockchain. Each IHS includes computer-executable instructions to receive a signal indicating that one of the FRUs has been removed, obtain unique identifying information about the removed FRU, and generate a new block to the blockchain indicating that the one FRU has been removed from the IHS. Additionally, the instructions may receive a signal indicating that another FRU has been added, obtain unique identifying information about the added FRU, and generate a new block to the blockchain indicating that the one FRU has been added to the IHS.

17 Claims, 4 Drawing Sheets

SYSTEM AND METHOD FOR DEVICE MANAGEMENT OF INFORMATION HANDLING SYSTEMS USING CRYPTOGRAPHIC BLOCKCHAIN TECHNOLOGY

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware, and software components that may be configured to process, store, and communicate information and may include one or more computer systems, data storage systems, and networking systems.

Blockchain technology enables a distributed method of managing a single immutable ledger of verified transactions. A blockchain ledger is decentralized, that is, no single central authority is in control of the ledger entries or updates, rather a network of authorized members share and verify the records that are to be added to the ledger. Once added, the block is immutable, that is, it cannot be changed or deleted. Before a block is committed to the ledger, blockchain technology allows one or more verifications to be computed and applied to the block, and only upon a satisfactory number and/or types of verification can the block become a part of the ledger. A block is uniquely identifiable in the ledger by an identifier associated with the block where the block identifier is unique to the ledger. Unless a block is last in a branch in the ledger, each block is connected to a previous block and a next block. Therefore, the blockchain allows verification of the history of a transaction recorded in a particular block by providing access to the previous and next blocks as far as needed up and down the ledger branches.

SUMMARY

According to one embodiment, a computing environment has multiple Information Handling Systems (IHSs), each having one or more field replaceable units (FRUs) and a ledger of a blockchain. Each IHS includes computer-executable instructions to receive a signal indicating that one of the FRUs has been removed, obtain unique identifying information about the removed FRU, and generate a new block to the blockchain indicating that the one FRU has been removed from the IHS. Additionally, the instructions may receive a signal indicating that another FRU has been added, obtain unique identifying information about the added FRU, and generate a new block to the blockchain indicating that the one FRU has been added to the IHS.

According to another embodiment, a blockchain-based device management method includes the steps of receiving an indication that one of a plurality of Field Replaceable Units (FRUs) of an Information Handling System (IHS) has been removed, obtaining unique identifying information about the FRU, and generating a new block to the blockchain indicating that the FRU has been removed from the IHS using the unique identifying information. The method also includes the steps of adding the new block to a ledger of a blockchain stored in the IHS.

According to yet another embodiment, a computer program product includes a computer readable storage medium with instructions stored thereon that, upon execution by a baseband management controller (BMC), perform the acts of receiving an indication that one of a plurality of Field Replaceable Units (FRUs) of the IHS has been removed, obtaining unique identifying information about the FRU, and generating a new blockchain block indicating that the FRU has been removed using the unique identifying information. The instructions also cause the BMC to add the new blockchain block to a blockchain ledger. The BMC is distinct from a host processor of an Information Handling System (IHS) on which the BMC is configured.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Embodiments of the present disclosure provide a system and method for device management of Information Handling Systems using cryptographic blockchain technology. Whereas traditional techniques for device management has often involved the use of hardwired identification information configured on each Field Replaceable Unit (FRU) in an Information Handling System (IHS), such techniques have required the use of additional hardware components that are becoming more scarce as time continues on. Embodiments of the present disclosure provide a solution to this problem, among others, by using blockchain technology to distribute information about FRUs that are added to and removed from an IHS by coordinating its verification with that of other IHSs in a computing environment, such as a datacenter where numerous IHSs may encounter maintenance procedures by multiple personnel.

Many currently deployed IHSs may be configured with FRUs, such as Power Supply Units (PSUs), Network Interface Cards (NICs), storage adapters, and the like. To ensure immutability (e.g., reliability), its unique identify (e.g., make, model, version number, serial number, etc.) is often statically stored in Read-Only Memory (ROM) (e.g., fuse memory) onboarded on the FRU. For IHSs that may be managed by an onboard Baseboard Management Controller (BMC), the static data in the FRU is read only once during initial turnup stage of the BMC. But using ROM to store static identifying information often adds additional chip cost to the FRU, which, has been removed due to ongoing shortages of silicon.

Standard software (e.g., software stack) provided by many IHS vendors typically includes a provision to define and use static tables, such as power budget tables, thermal control tables, i2c tables, and the like. Updates to these tables can be done via BMC update; however, there is also provision to implement a virtual table using Intelligent Platform Management Interface (IPMI) commands. To address the FRU shortage problem, a virtual FRU table may be implemented similar to other existing tables. But this may not solve the problem completely and lacks innovation from usability perspective.

It is highly likely that a customer may acquire similar FRUs (e.g., cards) to replace other FRUs in certain IHSs in a datacenter. It would not be beneficial, however, to execute commands on every box, which would otherwise be required. For the same reasons, an optimal scenario would be to implement a software update (i.e., churn) for the BMC to implement those static table updates. Plans exist to update the static table without updating the BMC code, but the problem with this solution is that updating often requires uploading the static tables manually on every box that requires the updated data. As will be described in detail herein below, embodiments of the present disclosure provide a solution to these problems, among others, by providing a system and method for device management of FRUs in IHSs using cryptographic blockchain technology that may not require software updates to the BMC, nor require manual maintenance on each IHS each time a FRU is added, replaced, or removed.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

A BMC generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of certain hardware devices in the IHS. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1:
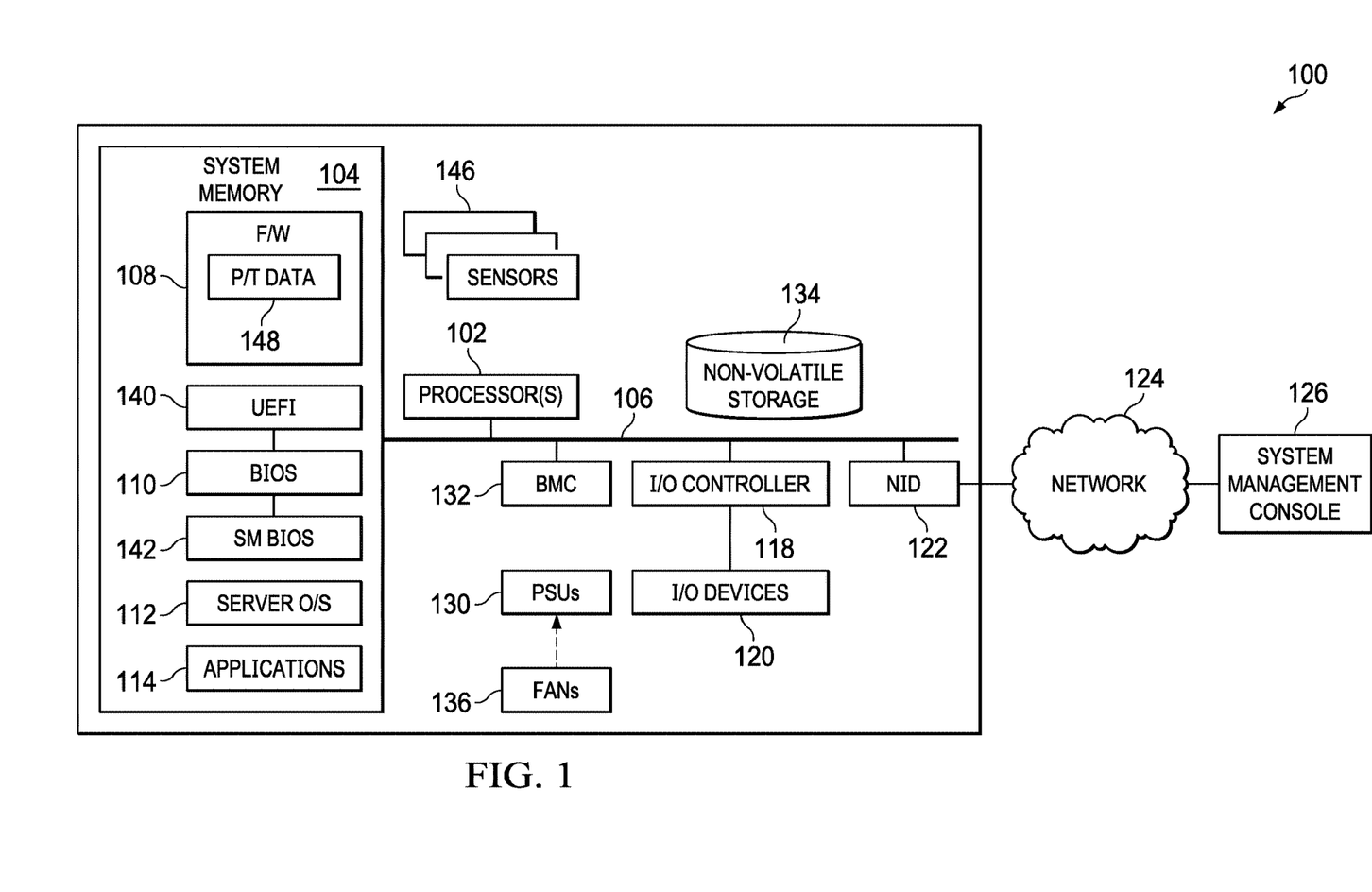
FIG. 1 is a block diagram of examples of components of an Information Handling System (IHS) that may be used to implement a blockchain enabled device management system and method according to one embodiment of the present disclosure.

FIG. 1 is a block diagram of examples of components of an Information Handling System (IHS) that may be used to implement a blockchain enabled device management system and method according to one embodiment of the present disclosure. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

For the purposes of this disclosure, term "system management console" may refer broadly to systems that are configured to couple to a management controller and issue management instructions for an information handling system (e.g., computing device) that is being managed by the management controller. One example of such a system management console is the Dell OpenManage Enterprise (OME) systems management console. In various embodiments, management consoles may be implemented via specialized hardware and/or via software running on a standard information handling system. In one embodiment, a system management console may be deployed on a secure virtual machine (VM), such as a VMWARE Workstation appliance.

IHS 100 further includes one or more power supply units (PSUs) 130. PSUs 130 are coupled to a BMC 132 via an I²C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
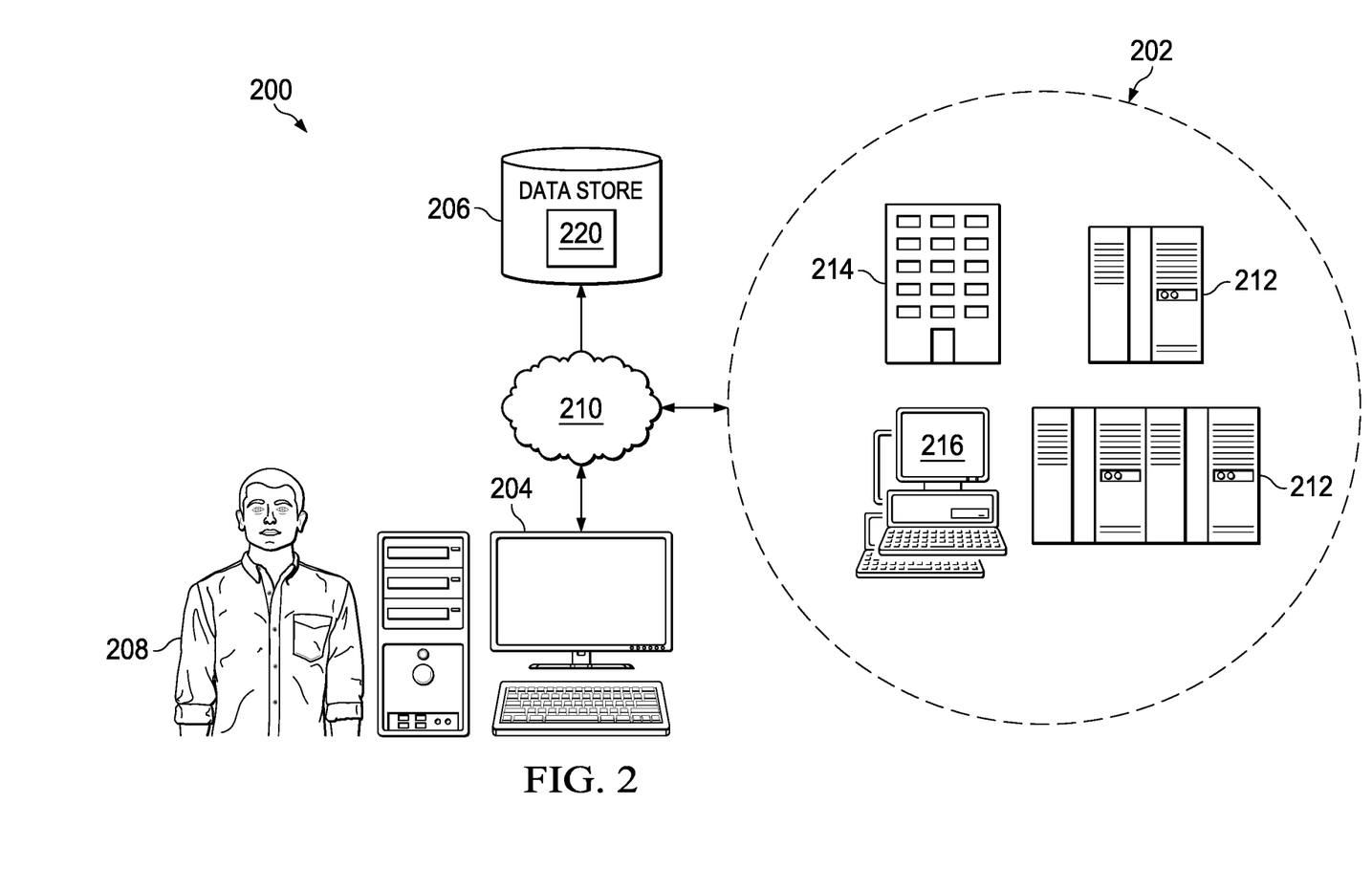
FIG. 2 illustrates an example blockchain enabled device management system that may be implemented on a computing environment according to one embodiment of the present disclosure.

FIG. 2 illustrates an example blockchain enabled device management system 200 that may be implemented on a computing environment according to one embodiment of the present disclosure. The blockchain enabled device management system 200 generally includes a computing environment 202 that is managed by a systems management appliance 204. The blockchain enabled device management system 200 also includes a data store 206 similar to data store 134 which is accessible by the systems management appliance 204 via the network 210. As shown, the systems management appliance 204 communicates with the computing environment 202 through a network 210. Nevertheless, it should be appreciated that the systems management appliance 204 may communicate locally with the computing environment 202, or form a part of the computing environment 202.

In general, the systems management appliance 204 is configured to monitor and control any number of computing devices in the computing environment 202. In one embodiment, the systems management appliance 204 provides at least a portion of the features of the systems management console 126 described herein above. The computing environment 202 may include any type and quantity of computing devices, such as those that may be included in a computing cluster 212, a data center 214, or multiple computing devices 216 of an organizational IHS, such as a business, or school. In one embodiment, certain IHSs (e.g., computing devices) of the computing cluster 212 and/or data center 214 may be similar in design and construction to the IHS 100 as described above with reference to FIG. 1. In one embodiment, systems manager appliance 204 includes at least a portion of the Dell EMC OpenManage Enterprise (OME), such as one that is installed on a secure virtual machine (VM) (e.g., VMWARE Workstation).

Administrative management is often provided via baseboard management controllers (BMCs). The baseboard management controller (BMC) generally includes a specialized microcontroller embedded on the motherboard of the IHS, and provides an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take some corrective actions, such as resetting or power cycling the system to get a hung O/S running again. These abilities save on the total cost of ownership of an IHS, particularly when implemented in large clusters, such as server farms.

In many cases, the IHSs configured in the computing environment 202 may be configured with FRUs that can be added, removed, and/or replaced. Furthermore, these FRUs can be added, removed, and/or replaced with little or no managerial oversight or accountability for what was changed and when it occurred. According to embodiments of the present disclosure, the systems management appliance 204 stores a ledger 220 in the data store 206 that includes updated FRU information for each IHS configured in the computing environment 202.

Blockchains provide a decentralized scheme for implementing authority and trust to a decentralized network and enables its nodes to continuously and sequentially record their transactions on a public "block", creating a unique "chain" referred to as a blockchain. Since blockchain is a distributed system, before adding a transaction to the blockchain ledger, some, most, or all peers need to reach a consensus status.

A blockchain is a distributed system which includes multiple nodes, which in this particular case are IHSs of the computing environment 202 that communicate with each other. A blockchain executes applications commonly referred to as chaincode (e.g., smart contracts, etc.) that holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Figure 3:
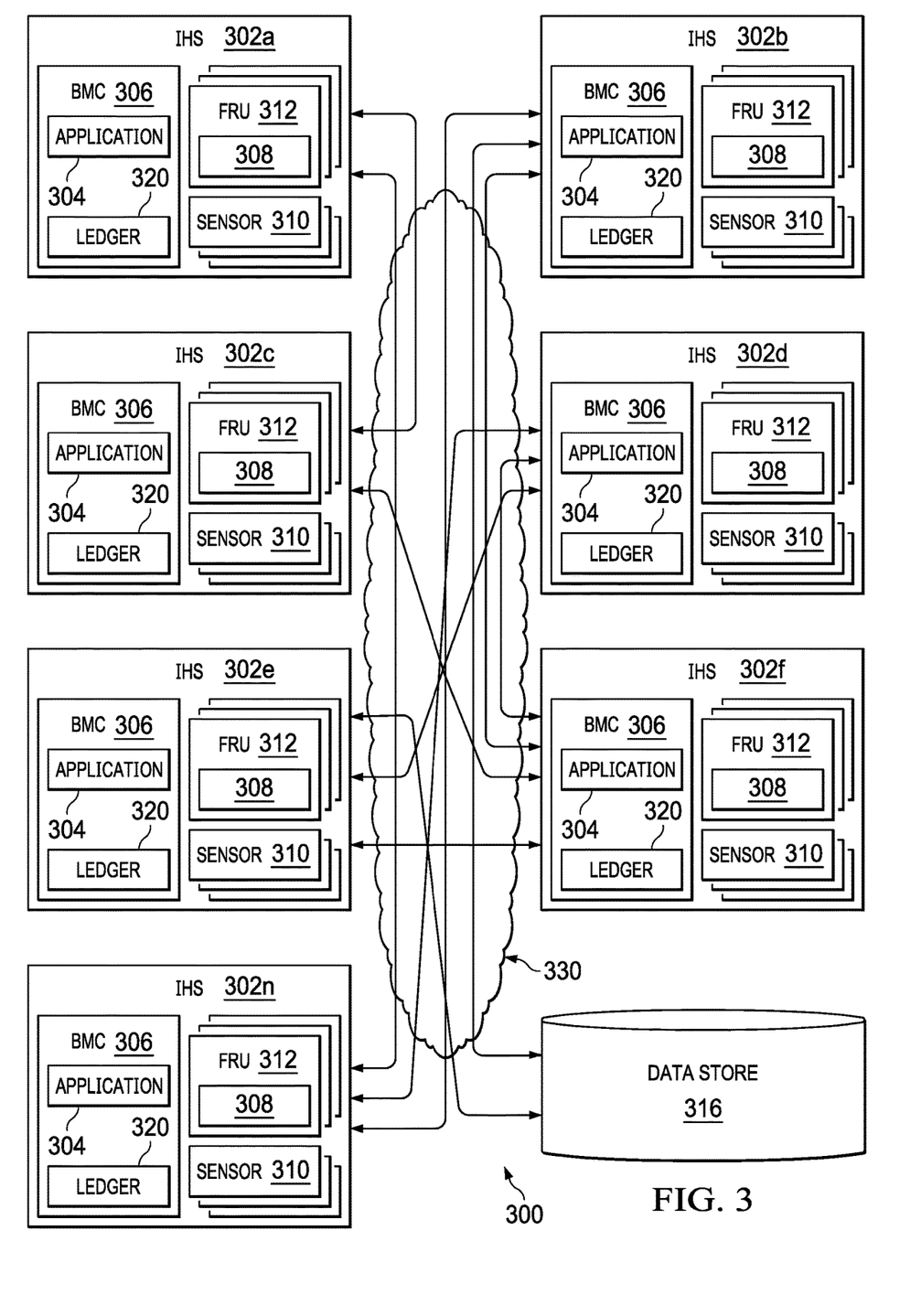
FIG. 3 is a schematic diagram illustrating another example blockchain enabled device management system that may be used to manage and account for Field Replaceable Units (FRUs) of multiple IHSs deployed in a computing environment according to one embodiment of the present disclosure.

FIG. 3 is a schematic diagram illustrating another example blockchain enabled device management system 300 that may be used to manage and account for FRUs of multiple IHSs deployed in a computing environment according to one embodiment of the present disclosure. The blockchain enabled device management system 300 generally involves a decentralized system in which multiple IHSs 302a-n (collectively referred to herein as IHSs 302) are in communication with one another via a network 330. The network 330 may include any of the types of networks described hereinabove.

Each IHS 302a-n includes a BMC 306, one or more FRUs 312, each having a FRU unique identifier 308 (UID), and one or more sensors 310. The FRU UID 308 stores information (e.g., make, model, version number, serial number, etc.) for sufficiently uniquely identifying its respective FRU from other FRUs that may be configured in the IHS 302. The sensors 310 generate a signal that indicates when a FRU is added to or removed from its respective IHS 302. In one embodiment, the sensors 310 form a part of a Management Component Transport Protocol (MCTP) Peripheral Component Interconnect Express (PCIe) vendor defined message (VDM) channel. The MCTP protocol provides a mechanism for generating signals that may be used by certain FRUs to detect when they are added and/or removed from their respective IHS 302 and are in common use today.

The distributed blockchain application 304 may be stored in memory of the one or more computing devices at the respective IHS and executable by one or more processors of the one or more computing devices at the respective IHS. In the present example, the IHSs 302 each have a distributed blockchain application 304 installed on a BMC 306 that manages the operation of its respective IHS 302. In other embodiments, it is contemplated that the distributed blockchain application 304 may be installed on other secure components of each IHS 302, such as in the BIOS 110 portion of its respective IHS 302.

The distributed blockchain application 304 includes one or more communication protocols for peer-to-peer file sharing ("P2P") that enable the distributed manufacturing techniques described herein. For example, the distributed blockchain application 304 includes logic and interfaces usable by the IHSs 302 to distribute data and electronic files over the network. In some embodiments, the system 300 also includes a data store 316 similar to data store 206 which is accessible by the IHSs 302 via the network. In other embodiments, a separate data store 316 may be omitted and replaced with a decentralized data store in which some or all of the IHSs 302 and/or other computing devices accessible by the IHSs 302 allocate memory for storage of unique identifying information (e.g., make, model, version number, serial number, etc.) for each FRU configured in each IHS 302. Such a decentralized data store may be implemented as part of the distributed blockchain application 304 or other decentralized data storage protocol, such as BitTorrent.

The distributed blockchain application 304 may be configured to write to a distributed ledger 320 similar to the ledger described above with reference to FIG. 2. In one embodiment, the ledger 320 may be built into the distributed blockchain application 304, while in other embodiments, the ledger 320 may be separate from the distributed blockchain application 304.

In the decentralized example of FIG. 3, any number of IHSs 302 may be networked together to form the system 300. Moreover, the system 300 may configured to include multiple separate ad hoc groups of IHSs 302 which may be defined based on a particular computing rack or computing sled in which the IHSs are placed, a geographical location of the IHSs, a type (e.g., vendor, make, model) of the IHSs, a leasee who has established a leasing agreement to use certain IHSs, and the like.

By increasing and distributing the number of IHSs 302 in the system 300, many additional functional advantages are provided. In a decentralized example such as system 300 for example, the system benefits from additional redundancy due to the fact that each node is capable of contributing to the interactions of the overall system. If one or more IHSs are inaccessible, the system may still be operational. Moreover, the distribution of the ledger 320 allows for transactions to be performed, written, read, and verified independently of the whole of the network. This capability ensures that any FRU updates, or other interactions can continue with only the minimum necessary number of participating IHSs, ensuring not only redundancy capabilities, but also decreasing overhead costs as participants are not responsible for operating all IHSs on the network.

In one embodiment, the ledger 320 is stored and maintained by a subset of the IHSs 302. In particular, the ledger 320 may be stored and maintained only be certain IHSs 302 and/or ledger 220 of systems management appliance 204. In other embodiments, the ledger 320 may be maintained by any number of one or more IHSs 302 in communication with the system 300. In some examples, the ledger may be stored and maintained by computing devices regardless of whether or not they are members or users of the computing environment. For instance, the ledger 320 may comprise an existing or general purpose distributed ledger, such as that used by Bitcoin, Ethereum, Hyperledger, and the like. In other examples the ledger 320 may be specific to a certain distributed manufacturing platform and/or may be stored and maintained only by members or users of the distributed manufacturing platform.

Figure 4:
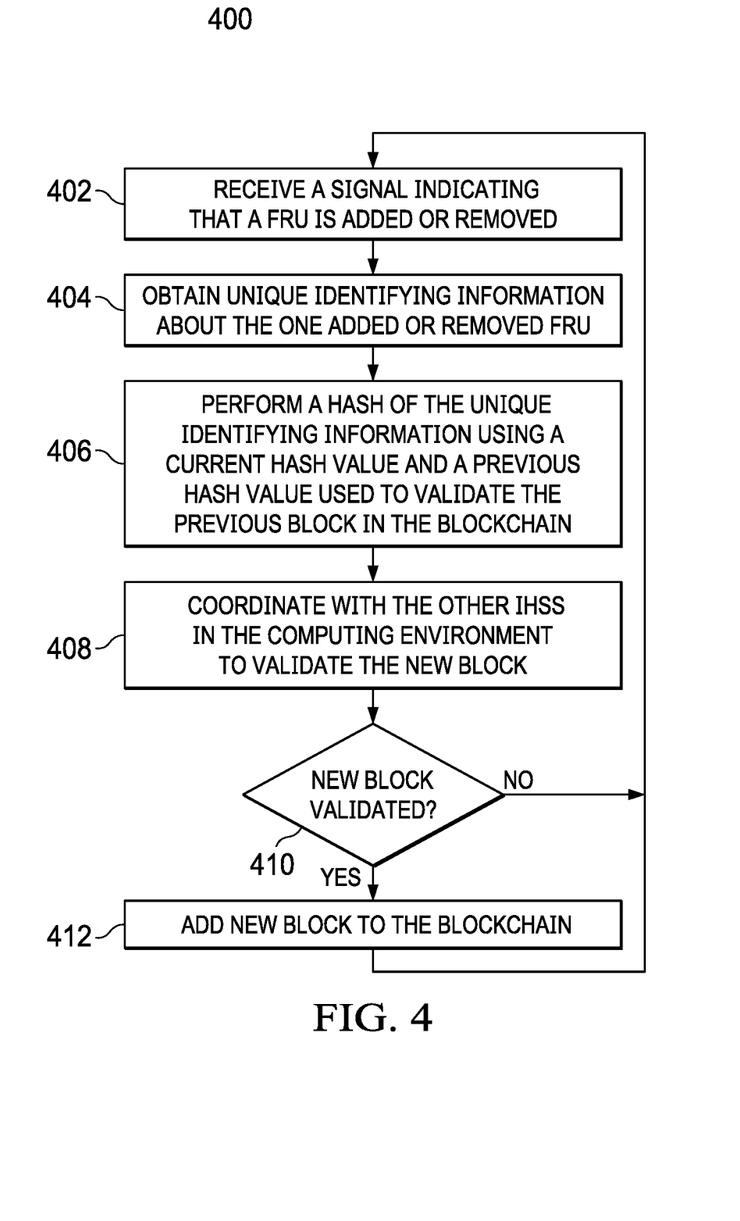
FIG. 4 illustrates an example blockchain enabled device management method according to one embodiment of the present disclosure.

FIG. 4 illustrates an example blockchain enabled device management method 400 according to one embodiment of the present disclosure. Additionally or alternatively, the method 400 may be performed in whole or in part by the blockchain enabled device management system 300 as described above with reference to FIG. 3. As will be described in detail herein below, the method 400 may be provided for device management of FRUs in IHSs using cryptographic blockchain technology that may not require software updates to the BMC, nor require manual maintenance on each IHS each time a FRU is added, replaced, or removed.

Initially, multiple IHSs are configured in a network, and a distributed blockchain application 304 is installed on the IHS. In one embodiment, the distributed blockchain application 304 is installed on BMC that manages the operation of each IHS. The method 400 may be performed each time a FRU is added to, removed from, or replaced with another FRU. In a particular example, the method 400 may be performed when the multiple IHSs are booted following the application of power, such as when they are initially deployed. Additionally, it should be understood that the method 400 described herein may be performed on some, most, or all IHSs configured in the computing environment.

At step 402, the method 400 receives a signal indicating that a FRU is added or removed. For example, the method 400 may receive the information in the form of a SPDM-based signal through a bus, such as a Peripheral Component Interconnect Express (PCIe) bus. Thereafter at step 404, the method 400 obtains unique identifying information about the one added or removed FRU. If the FRU has been removed from the IHS, the method 400 may perform a discovery operation to determine which FRUs are still configured in the IHS, and compare such information with stored information in the previous block of the blockchain to determine which FRU has been removed. If the signal is associated with a FRU that has been added, the method 400 may obtain the unique identifying information from FRU's onboard code (e.g., FRU UID 308). It should be important to note that the unique identifying information does not require the reliability and immutability as would otherwise be required by a dedicated FRU identity chip due to the coordinated validation blockchain process provided by multiple cooperating IHSs in the computing environment.

If the added or removed FRU is associated with the IHS on which method 400 is being performed, the method 400 may send a transaction data message to each of the other IHSs so that they can validate the change. Additionally, if the added or removed FRU is associated with the IHS on which method 400 is being performed, the method 400 may generate a new hash value that is used to generate the new block along with the hash value of the previously generated block. Conversely, if the added or removed FRU is associated with another IHS in the computing environment, the obtained unique identifying information and new hash value is obtained via a transaction data message received from another IHS on which the method 400 performed.

At step 406, the method 400 performs a hash of the unique identifying information using a current hash value and a previous hash value used to validate the previous block in the blockchain. Thereafter at step 408, the method 400 coordinates with the other IHSs in the computing environment to validate the new block.

At step 410, the method 400 determines whether or not the block has been validated by itself and the other IHSs in the computing environment. If so, processing continues at step 412 to add the new block to the blockchain; otherwise, processing continues at step 402 in which the new block is not added to the blockchain, and the method 400 processes the next signal received by the system.

Thus as can be seen, the method 400 described above can be repeatedly performed to generate an immutable inventory of all FRUs configured in the IHSs of a computing environment. Furthermore, the method 400 may obviate the need for a dedicated FRU UID chip, which can be costly given present day chip shortages. Nevertheless, when use of the workspace migration method 400 is no longer needed or desired, the process ends.

Although FIG. 4 describes an example method that may be performed to manage and account for FRUs of multiple IHSs deployed in a computing environment, the features of the method 400 may be embodied in other specific forms without deviating from the spirit and scope of the present disclosure. For example, the method 400 may perform additional, fewer, or different operations than those described in the present examples. For another example, the method 400 may be performed in a sequence of steps different from that described above. As yet another example, certain steps of the method 400 may be performed by other components in the IHS 100 other than those described above.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A computing environment, comprising:
a plurality of Information Handling Systems (IHSs) configured in the computing environment, each of the IHSs comprising:
a processor; and
a memory coupled to the at least one processor, the memory having instructions stored thereon that, upon execution by the processor, cause one of the IHSs to:
receive an indication that a Field-Replaceable Unit (FRU) has been removed from the one IHS;
obtain unique identifying information about the FRU;
generate a blockchain block indicating that the FRU has been removed from the one IHS using the unique identifying information;

add the blockchain block to a blockchain ledger when the blockchain block has been validated by the other IHSs;

receive another indication that a table of the one IHS has been updated, the table comprising at least one of: a thermal control table, a power budget table, or an 12C table;

obtain information about the updated table;

generate another blockchain block using the obtained information; and add the other blockchain block to the blockchain ledger.

2. The computing environment of claim 1, wherein the instructions, upon execution, further cause the one IHS to:

receive another indication that another FRU has been added to the one IHS;

obtain other unique identifying information about the other FRU;

generate another blockchain block indicating that the other FRU has been added to the one IHS using the other unique identifying information; and add the other blockchain block to the blockchain ledger.

3. The computing environment of claim 1, wherein the indication is generated by at least one sensor configured in the one IHS.

4. The computing environment of claim 1, wherein the processor is separate and distinct from a host processor of the one IHS.

5. The computing environment of claim 4, wherein the processor comprises a baseboard management controller (BMC).

6. The computing environment of claim 1, wherein the instructions, upon execution, further cause the one IHS to cause another IHS to add at least a portion of the blockchain block to another instance of the blockchain ledger kept by the other IHS.

7. The computing environment of claim 1, wherein the blockchain block comprises a previous hash value generated from a cryptographic hash function of a preceding blockchain block.

8. A blockchain-based device management method, comprising:

receiving an indication that one of a plurality of Field Replaceable Units (FRUs) of one of a plurality of Information Handling Systems (IHSs) has been removed, wherein the one IHS stores a ledger of a blockchain;

obtaining unique identifying information about the FRU;

generating a new block to the blockchain indicating that the FRU has been removed from the one IHS using the unique identifying information;

adding the new block to the ledger when the blockchain block has been validated by the other IHSs;

receiving another indication that a table of the one IHS has been updated, the table comprising at least one of: a thermal control table, a power budget table, or an 12C table;

obtaining information about the updated table:

generating another blockchain block using the obtained information; and adding the other blockchain block to the blockchain ledger.

9. The blockchain-based device management method of claim 8, further comprising:

receiving another indication that another FRU has been added to the one IHS;

obtaining other unique identifying information about the other FRU;

generating another new block to the blockchain indicating that the other FRU has been added to the one IHS using the other unique identifying information; and adding the other new block to the ledger.

10. The blockchain-based device management method of claim 8, wherein receiving the indication comprises receiving an indication from at least one sensor coupled to the one IHS.

11. The blockchain-based device management method of claim 8, further comprising coordinating with another IHS, wherein the other IHS comprises another ledger, to add at least a portion of the new block to the other ledger.

12. The blockchain-based device management method of claim 8, wherein the receiving, obtaining, generating, and adding are performed by a baseboard management controller (BMC) of the one IHS.

13. A computer program product comprising a non-transitory computer readable storage medium having program instructions stored thereon that, upon execution by a baseboard management controller (BMC) distinct from a host processor of one of a plurality of Information Handling Systems (IHSs), cause the BMC to:

receive an indication that one of a plurality of Field Replaceable Units (FRUs) of the one IHS has been removed;

obtain unique identifying information about the FRU;

generate a new blockchain block indicating that the FRU has been removed using the unique identifying information;

add the new blockchain block to a blockchain ledger when the blockchain block has been validated by the other IHSs;

receive another indication that a table of the one IHS has been updated, the table comprising at least one of: a thermal control table, a power budget table, or an 12C table;

obtain information about the updated table;

generate another blockchain block using the obtained information; and add the other blockchain block to the blockchain ledger.

14. The computer program product of claim 13, wherein the instructions, upon execution, further cause the BMC to:

receive another indication that another FRU has been added to the one IHS;

obtain other unique identifying information about the other FRU;

generate another new blockchain block indicating that the other FRU has been added using the other unique identifying information; and add the other new blockchain block to the blockchain ledger.

15. The computer program product of claim 13, wherein the instructions, upon execution, further cause the BMC to receive the indication from at least one sensor configured in the one IHS.

16. The computer program product of claim 13, wherein the instructions, upon execution, further cause the BMC to coordinate with other BMCs of other IHSs to add at least a portion of the new blockchain block to respective ledgers.

17. The computer program product of claim 13, wherein the instructions, upon execution, further cause the BMC to generate the new blockchain block using a previous hash value generated from a cryptographic hash function of a preceding blockchain block.

* * * * *